(12) United States Patent
Prud'Homme

(10) Patent No.: US 9,174,157 B2
(45) Date of Patent: *Nov. 3, 2015

(54) ENERGY RECUPERATING FILTRATION APPARATUS

(75) Inventor: Guy Prud'Homme, Mont-Royal (CA)

(73) Assignee: AIREX ENERGIE INC., Laval, Quebec (CA)

( * ) Notice: Subject to any disclaimer, the term of this patent is extended or adjusted under 35 U.S.C. 154(b) by 570 days.

This patent is subject to a terminal disclaimer.

(21) Appl. No.: 13/398,032

(22) Filed: Feb. 16, 2012

(65) Prior Publication Data

US 2012/0145003 A1   Jun. 14, 2012

Related U.S. Application Data

(62) Division of application No. 12/750,727, filed on Mar. 31, 2010, now Pat. No. 8,142,551.

(30) Foreign Application Priority Data

Mar. 30, 2010   (CA) ..................... 2698176

(51) Int. Cl.
| | |
|---|---|
| B01D 45/00 | (2006.01) |
| B01D 46/24 | (2006.01) |
| B01D 45/16 | (2006.01) |
| B01D 50/00 | (2006.01) |
| B01D 46/00 | (2006.01) |
| B01D 46/52 | (2006.01) |
| B01D 45/12 | (2006.01) |
| B01D 46/48 | (2006.01) |

(52) U.S. Cl.
CPC ............ *B01D 46/2411* (2013.01); *B01D 45/12* (2013.01); *B01D 45/16* (2013.01); *B01D 46/0005* (2013.01); *B01D 46/0046* (2013.01); *B01D 46/48* (2013.01); *B01D 46/521* (2013.01); *B01D 50/002* (2013.01)

(58) Field of Classification Search
CPC . B01D 46/2411; B01D 46/48; B01D 46/0046
USPC ........... 55/302, 337, 459.1, 428, 429; 95/273, 95/107; 96/150, 134
See application file for complete search history.

(56) References Cited

U.S. PATENT DOCUMENTS

| | | | |
|---|---|---|---|
| 2,656,242 A | 10/1953 | Matheson | |
| 2,804,168 A | 8/1957 | Church | |
| 3,470,678 A * | 10/1969 | Schumacher et al. | 55/434.1 |
| 3,525,199 A | 8/1970 | Crommelin, Jr. et al. | |
| 3,577,705 A | 5/1971 | Sharlit | |
| 3,606,736 A | 9/1971 | Raymond et al. | |
| 4,235,610 A | 11/1980 | Richard | |

(Continued)

*Primary Examiner* — Dung H Bui

(74) *Attorney, Agent, or Firm* — Norton Rose Fulbright Canada LLP

(57) ABSTRACT

A filtration apparatus comprises a casing defining an inner cavity with an upper cylindrical portion and a lower hopper portion. An inlet feeds gas and solids into the inner cavity and causes movement of the solids in a downward spiral path in the casing. A solids outlet at a bottom of the lower hopper portion outlets the solids from the casing. A gas outlet exhausts gases from the casing. An annular arrangement of ports in a wall of the casing injects an other gas in the inner cavity. The ports are oriented to guide the other gas into following a partially vertical path into the inner cavity to disrupt the movement of the solids in the downward spiral path to allow a capture of the solid particles by the capturing solids. A gas source is connected to the arrangement of ports.

12 Claims, 3 Drawing Sheets

(56) References Cited

U.S. PATENT DOCUMENTS

| | | |
|---|---|---|
| 4,398,931 A * | 8/1983 | Shevlin ................. 55/341.1 |
| 4,731,100 A | 3/1988 | Loeffelmann et al. |
| 4,810,270 A | 3/1989 | Terry et al. |
| 5,395,409 A | 3/1995 | Klimczak et al. |
| 6,309,447 B1 | 10/2001 | Felix |
| 6,605,139 B2 | 8/2003 | Felix |
| 7,517,393 B2 | 4/2009 | Richard |
| 7,896,950 B2 | 3/2011 | Xia |
| 2004/0109800 A1 | 6/2004 | Pahlman et al. |
| 2007/0039290 A1 | 2/2007 | Lee |
| 2009/0250331 A1 | 10/2009 | Hopkins et al. |
| 2010/0012595 A1 * | 1/2010 | Yang et al. ................. 210/768 |
| 2011/0296995 A1 | 12/2011 | Kuske et al. |

\* cited by examiner

ENERGY RECUPERATING FILTRATION APPARATUS

CROSS-REFERENCE TO RELATED APPLICATION

The present patent application claims priority on Canadian Patent Application No. 2,698,176, filed on Mar. 30, 2010, by the present Applicant.

FIELD OF THE APPLICATION

The present application relates to a filtration apparatus of the type used in processes and systems in which bulk materials are transformed into a smaller uniform format, such as granules, pellets, or the like.

BACKGROUND OF THE ART

It is commonly known to process bulky materials to convert these to a given format. For example, in the animal-feed industry, the feed is often produced as a mass of raw material, and must be converted to a suitable particle format (granules, balls, pellets, among many other possibilities) to be edible by animals. As another example, in the production of fuel from biomass, it is desired to produce pellets as pellets are well suited for efficient combustion.

Accordingly, various systems and processes are commonly used for such transformation. However, such systems and processes may always be improved in terms of energy efficiency, whereas waste resulting from the transformation must be minimized.

SUMMARY OF THE APPLICATION

It is therefore an aim of the present disclosure to provide a novel filtration apparatus.

Therefore, in accordance with the present application, there is provided a filtration apparatus for filtering solid particles from a gas, with capturing solids, comprising: a casing defining an inner cavity with an upper cylindrical portion, and a lower hopper portion connected to the upper cylindrical portion; at least one inlet in the upper cylindrical portion for feeding a flow of gas and solids into the inner cavity, the at least one inlet being positioned with respect to the casing to cause movement of the solids in a downward spiral path in the casing; a solids outlet at a bottom of the lower hopper portion for outletting the solids from the casing; a gas outlet in the upper cylindrical portion to exhaust gases from the casing; an annular arrangement of ports in a wall of the casing to inject an other gas into the inner cavity, the ports being oriented so as to guide the other gas into following a path at least partially vertical when entering the inner cavity to disrupt the movement of the solids in the downward spiral path to allow a capture of the solid particles by the capturing solids; and a gas source connected to the arrangement of ports for the injection of the other gas into the inner cavity.

Further in accordance with the present application, there is provided a method for filtering solid particles from exhaust air in a process of the type in which raw material is transformed into elements of predetermined shape, the process using drying air to remove at least one of moisture and heat from the mass of raw material, with air exhausted from the process having solid particles of the raw material in suspension, comprising: supplying a flow of the exhaust air having solid particles of the raw material in suspension, and parts of the raw material to a filtration apparatus; inducing a mixing of the exhaust air and of the raw material in the filtering apparatus for the raw material to capture solid particles; outletting the raw material with captured solid particles from the filtering apparatus; and outletting the exhaust air without the captured solid particles separately from the raw material.

DESCRIPTION OF THE PREFERRED EMBODIMENTS

Figure 1:
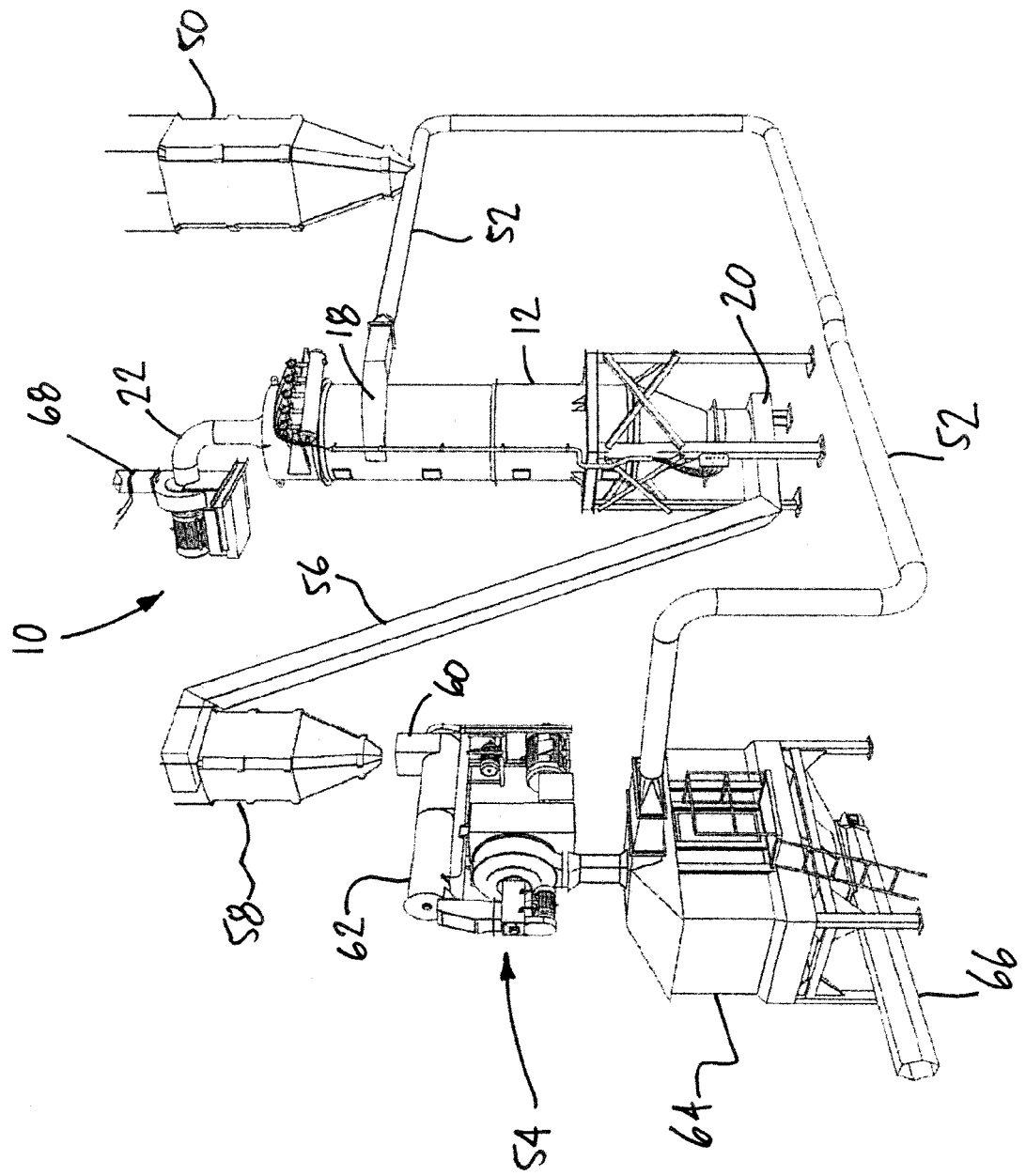
FIG. 1 is a perspective view of a system using a filtration apparatus in accordance with the present disclosure.

Referring to the drawings and more particularly to FIG. 1, there is illustrated a gas filtration apparatus 10 in accordance with the present disclosure. The filtration apparatus 10 is illustrated in any appropriate system or process requiring the separation of a solid from a gas, such as a feed-producing system A of FIG. 1. Among numerous possibilities, the filtration apparatus 10 may be used to recuperate energy from a gas or from a solid, to allow a reaction between a solid and solids in suspension in the gas, to allow the absorption of moisture by the solids. The possibilities will be related to the process with which the filtration apparatus 10 is used.

Figure 2:
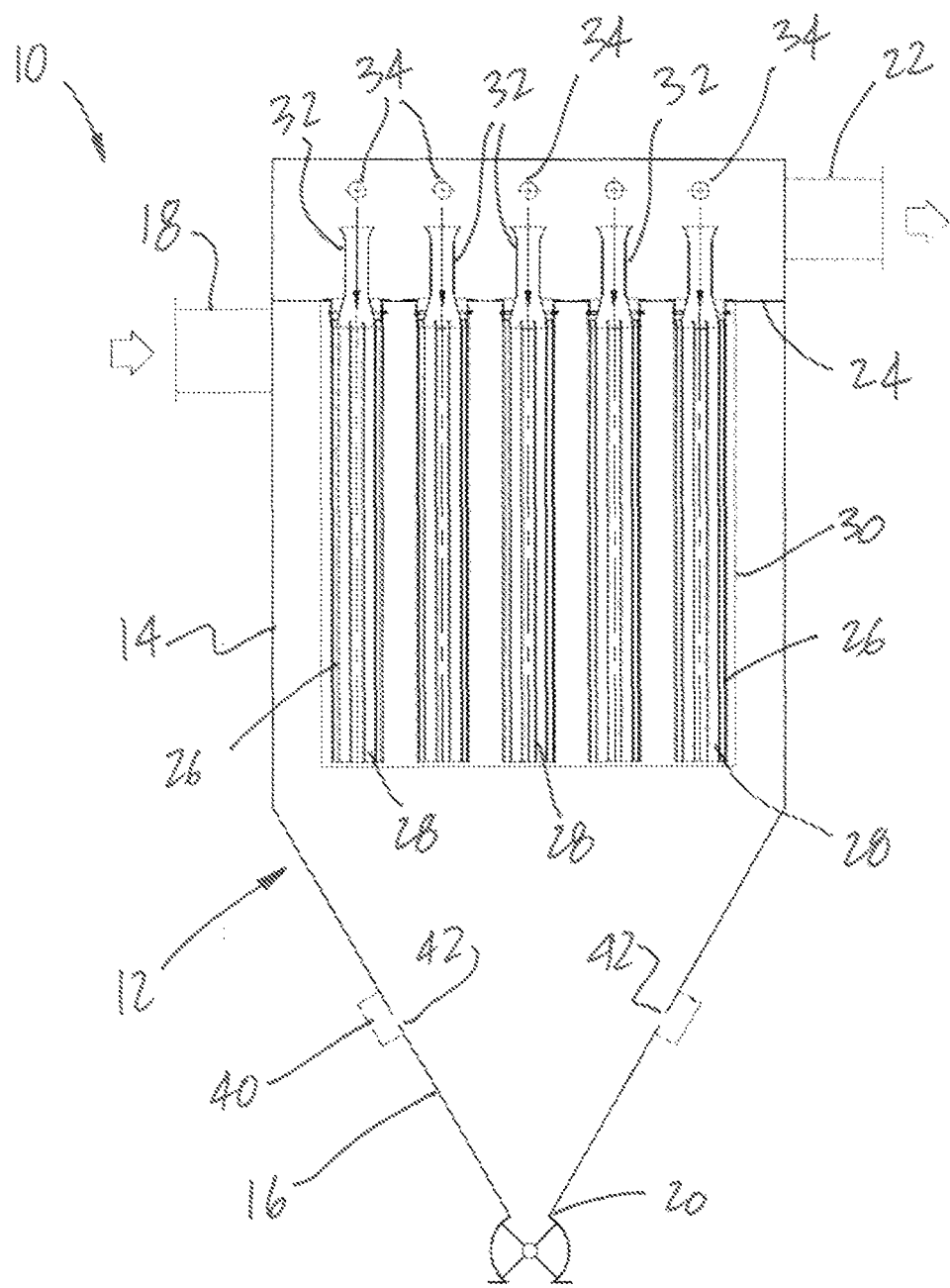
FIG. 2 is a schematic sectional view of the filtration apparatus used in the system of FIG. 1.

Referring to FIG. 2, the filtration apparatus 10 is shown in greater detail. The filtration apparatus 10 has a casing 12 defining an inner cavity in which the filtration process takes place. The casing 12 has an upper cylindrical portion 14, and a lower hopper portion 16. The lower hopper portion 16 has an inverted conical shape, whereby the casing has a circular section (or arcuate) along its vertical axis. An elliptical section may also be considered for the casing 12.

An inlet 18 merges into a wall of the cylindrical portion 14 so as to be in fluid communication with the inner cavity of the casing 12. The inlet 18 may be tangentially oriented with respect to the cylindrical portion 14, as it is desired to create a cyclonic flow in the inner cavity of the casing 12. Although a single inlet 18 is illustrated in FIG. 2, the casing 12 may have two or more inlets, for instance in accordance with the process or system using the filtration apparatus 10. The inlet 18 is preferably provided in the upper half of the cylindrical portion 14 of the casing 12.

A solids outlet 20 is provided at a bottom end of the hopper portion 16, for instance at the tip of the inverted conical shape, and is thus in fluid communication with the inner cavity of the casing 12. Solids therefore exit the casing 12 via the solids outlet 20 by the effect of gravity. A valve may close the solids outlet 20 to maintain a given pressure or flow conditions in the inner cavity of the casing 12. For instance, the valve 21 is a rotary valve.

A gas outlet 22 is provided in the top of the cylindrical portion 14, and is also in fluid communication with the inner cavity of the casing 12. The gas outlet 22 may be connected to a side wall of the cylindrical portion 14, or to the top wall of the cylindrical portion 14. Filtrated gas therefore exits the casing 12 through the gas outlet 22.

The inner cavity of the casing 12 is divided into two compartments by a support wall 24. The support wall 24 supports filters, whereby the unfiltered gas and solids circulate in the compartment below the support wall 24, whereas the filtered gas circulates in the compartment above the support wall 24 to exit the casing 12.

In FIG. 2, the support wall 24 has throughbores, with cages 26 hanging from each throughbore. The cages 26 therefore extend into the lower compartment of the casing 12, although they could also be arranged to extend in the upper compartment of the casing 12.

Filtering membranes 28 are retained by the cages 26, and are selected to filter out given sizes of solid particles. The filtering membranes 28 cover any free space in the cages 26 to prevent solids from exiting the casing 12 through the gas outlet 22. According to an embodiment, the filtering membranes 28 are sleeves slipped onto the cages 26. For instance, the membranes 28 are made of a polyester, although any other suitable material may be used. Any other type of filtering member may be used as an alternative to the filtering membranes 28. For instance, it is considered to position a circular filtering mesh or screen directly in each throughbore of the support wall 24.

A protection skirt 30 projects downwardly from the support wall 24 and encompasses the cages 26 and filtering membranes 28. According to an embodiment, the skirt 30 has a circular section, whereby the wall of the cylindrical portion and the protection skirt concurrently form an annular plenum. The annular plenum may enhance the cyclonic flow of gas in the inner cavity of the casing 12, as described hereinafter.

Still referring to FIG. 2, nozzles 32 may be provided in the throughbores of the support wall 24. The nozzles 32 are of the Venturi type and increase the velocity of a blowback flow into the filtering membranes 28. The blowback flow is produced by jets 34. The jets 34 are connected to a pressure source (e.g., compressed air network, a compressor, etc.), and oriented to outlet a flow of compressed air toward the nozzles 32. The blowback flow may be periodically performed. Alternatively, a pressure differential may be measured on opposed sides of the filtering membranes 28, with the blowback being automatically performed if the pressure differential is above a given threshold value.

Figure 3:
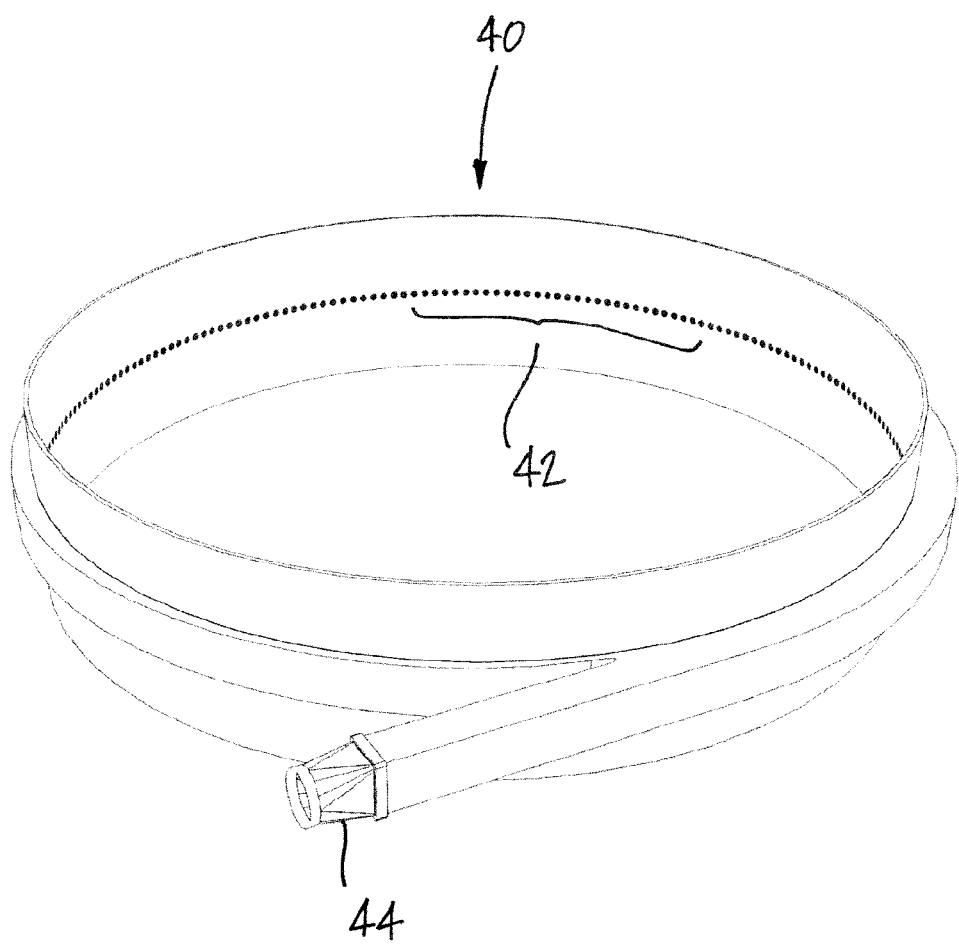
FIG. 3 is a perspective view of a sustentation ring of the filtration apparatus of FIG. 1.

Referring to FIGS. 2 and 3, a sustentation ring 40 is provided about the wall of the casing 12 at the level of the hopper portion 16. The sustentation ring 40 is positioned on the wall of the hopper portion 16 to blow air into the inner cavity of the casing 12. In an embodiment, the sustentation ring 40 is approximately located midway along a vertical axis of the hopper portion 16. However, the sustentation ring 40 may be located at other heights along the vertical axis, notably about the midway line. Accordingly, the sustentation ring 40 is in fluid communication with the inner cavity through a plurality of relatively small ports 42.

The ports 42 are arranged in a ring in the wall of the casing 12, and therefore inject a gas (e.g., air) into the inner cavity, with an upward vector component. Accordingly, the solids blown along a downward cyclonic path in the inner cavity of the casing 12 will be lifted by the gas injected by the sustentation ring 40. A pressure source (not shown), such as a blower, fan or compressor, is in fluid communication with an inlet 44 of the sustentation ring 40. The pressure of air injected by the ports 42 may be controlled by adjusting the level of actuation of the pressure source. By controlling the pressure of air injected by the ports 42, a residence time of the solids in the inner cavity of the casing 12 may be increased or decreased.

In an embodiment, the ports 42 are sized (e.g., between 0.25 and 0.375 in for an inner diameter between 16 and 18 in for the ring 40) to inject gas at a flow rate of about 2 CFM per port, with a velocity ranging between 3500 and 4000 FPM. There are a plurality of ports 42 (e.g., between 40 and 60 ports), spread over the full circumference of the hopper portion 16.

Now that various components of the filtration apparatus 10 have been described, a reaction taking place in the filtration apparatus 10 is described.

Solids and gases to be separated are fed to the casing 12 via the inlet 18, or inlets 18. In an embodiment, the solids and liquid are mixed in a same pipe upstream of the inlet 18, and hence enter the inner cavity of the casing 12 concurrently. Typically, the solids are in a granular or aggregate form, whereas the gases may be filled with solid particles in suspension. Moreover, the solids and gases may be a different temperatures, and may have different levels of humidity/moisture content.

The solids and gases enter the inner cavity of the casing 12, and follow a downward cyclonic path. More specifically, the inlet of gases 18 is oriented with respect to the casing 12 so as to create a circular flow of the gas into the inner cavity. Because of the effect of gravity, the solids conveyed by the gas will move in a spiral toward the solids outlet 20, i.e., along a downward cyclonic path.

Upon reaching the height of the ports 42, the gas injected by the sustentation ring 40 will lift the solids, increasing their residence time in the casing 12. According to some embodiments, it may be desired to increase the residence time of the solids. For instance, the increased residence time may result in a temperature or moisture-content adjustment for the solids. If the gas is hotter or more humid than the solids, the solids may be heated, or may absorb humidity from the gas. Moreover, there may be some reaction between the solids and solid particles in suspension in the gas. Accordingly, an increased residence time may increase the level of solid particles captured by the solids. Accordingly, the raw material is a capturing solid that captures the solid particles from the gas.

The solids then reach the solids outlet 20, while the gas follows a straight cyclonic upward path toward the filtering membranes 28. Solid particles remaining in the gas are filtered out of the gas by the filtering membranes 28, whereby the gas exits the lower compartment of the casing 12 with a filtered level of solid particles.

The filtration apparatus 10 is readily cleaned. More specifically, as the inner cavity of the filtration apparatus 10 has very few edges, corners, cavities and components, the use of a pressurized fluid may be sufficient to remove unwanted particles from the surfaces of the inner cavity.

Referring to FIG. 1, the filtering apparatus 10 may be used in any applicable systems/processes, such as thermo-transformation, roasting, feed production, biomass production, etc., in which a raw material (e.g., in a bulky, chunky state) is transformed into smaller elements of a generally uniform shape. The system A of FIG. 1 is equipped to perform a feed production. Feed must be in the form of pellets within a predetermined size range. The system A is used to convert feed from a bulk chunk state to pellets, having a predetermined moisture content and temperature.

A bulk feed hopper 50 outlets the feed in the bulk chunk state into an air conveyor 52. The air conveyor 52 is, for instance, a pipe in which a gas flows, thereby entraining the feed from the hopper 50. Although not shown, an appropriate valve (e.g., rotary valve) may be provided at the outlet of the hopper 50 to control the amount of feed entering the air conveyor 52. A rotary valve may, for instance, separate the outlet into small batches of bulk feed.

The air conveyor 52 is in fluid communication with the inlet 18 of the filtration apparatus 10. The treatment of the gas and feed in the filtration apparatus 10 will be described hereinafter. The feed exits the filtration apparatus 10 via the solids outlet 20 of the casing 12 with an increased temperature and/or moisture content, and thus in a softened state.

The feed is then directed to an extruder unit 54 that converts the bulky feed to pellets. To direct the feed from the filtering apparatus 10 to the extruder unit 54, another air conveyor 56 is used in conjunction with an extruder hopper 58. The air conveyor 56 may have its own blower, or may use residual pressure flow from the filtration apparatus 10.

The extruder unit 54 receives the feed from the hopper 58, via inlet 60, in the softened state. Steam may be injected into the feed to further soften it with a view to being transformed. The extruder unit 54 may for instance be a Bliss™ unit, or any appropriate shaping unit that converts bulky feed into an appropriate format. The extruder unit 54 has an endless screw portion 62 pressing the feed against an extrusion disc (not shown). Accordingly, the feed pressed against the extrusion disc will be converted to pellets by passing through holes in the extrusion disc.

A drying unit 64 receives the feed pellets from the extruder unit 54. The feed pellets are in the softened state, and thus have relatively high moisture content and/or temperature. In the drying unit 64, the feed pellets are therefore dried, and cooled if necessary. Any appropriate drying unit may be used. For instance, a Law-Marot™ drying unit (e.g., Milpro™) may be used.

The drying unit 64 typically uses a flow of air to dry the feed pellets. The drying unit 64 may be of the type having a reciprocating sieve into which air is blown against a descending mass of feed pellets. Alternatively, the drying unit 64 may feature a mesh conveyer or the like, also allowing air to be blown against the feed pellets. Therefore, once the feed pellets are dried, they exit the system A, for instance via outlet conveyor 66.

The air exiting the drying unit 64, namely the exhaust air, is humid and warm, as it has contacted the feed pellets to dry and cool them. Moreover, the air typically has a non-negligible level of solid particles in suspension. Accordingly, the drying unit 64 is connected to the filtration apparatus 10 by the air conveyor 52. This will allow the exhaust air to be used as conveying gas for the air conveyor 52 to convey the bulky feed from the bulk feed hopper 50.

The filtration apparatus 10 allows the bulk feed to be preheated by the exhaust air. Moreover, the bulk feed is usually drier than the exhaust air, whereby the bulk feed absorbs humidity from the exhaust air. The preheating and moisturizing of the bulk feed will soften the amount of steam required by the extruder unit 54. Also, the solid particles in suspension in the exhaust air may adhere to the bulk feed in the filtration apparatus 10. Therefore, the filtration apparatus 10 allows the recuperation of waste heat, humidity and solids from the exhaust air, simultaneously cleaning the exhaust air for its exhaust to the atmosphere, via the gas outlet 22. A heat exchanger 68 may be provided in the gas outlet 22 to absorb more heat from the air exiting the filtration apparatus 10. A refrigerant circulates in the heat exchanger 68. The refrigerant may be any one of a synthetic refrigerant, alcohol-based refrigerant (e.g., glycol), or heat-transfer fluid (i.e., cooling fluid). The recuperated heat may be used in any appropriate way. For instance, it may be used to preheat the water of a boiler producing the steam for the extruder unit 54. According to another embodiment of the system A, the filtration is performed by an endless screw unit, in which the exhaust gas and bulky feed are mixed. The rotational speed of the endless screw unit is controlled to adjust the residence time of the exhaust gas and bulky feed therein, to allow the bulky feed to absorb some humidity and heat from the exhaust gas, and to capture solids in suspension.

The invention claimed is:

1. A filtration apparatus for filtering solid particles from a gas, with capturing solids, comprising:
    a casing defining an inner cavity with an upper cylindrical portion, and a lower hopper portion connected to the upper cylindrical portion;
    at least one inlet in the upper cylindrical portion for feeding a flow of gas and solids into the inner cavity, the at least one inlet being positioned with respect to the casing to cause movement of the solids in a downward spiral path in the casing;
    a solids outlet at a bottom of the lower hopper portion for outletting the solids from the casing by gravity;
    a gas outlet in the upper cylindrical portion to exhaust gases from the casing;
    an annular arrangement of ports in a wall of the casing to inject an other gas into the inner cavity, the ports being oriented so as to guide the other gas into following a path at least partially vertical when entering the inner cavity to disrupt the movement of the solids in the downward spiral path to allow a capture of the solid particles by the capturing solids;
    an annular casing on an outer periphery of the casing opposite the ports, the annular casing concurrently forming with the outer periphery of the casing an annular cavity in fluid communication with the annular arrangement of the ports in the wall of the casing, the annular cavity being delimited radially outwardly by the annular casing and radially inwardly by the outer periphery of the casing; and
    a gas source connected to the annular casing for the injection of the other gas into the inner cavity via the annular cavity.

2. The filtration apparatus according to claim 1, further comprising filtering means at the gas outlet to filter out solid particles in suspension in the gas.

3. The filtration apparatus according to claim 2, wherein the filtering means comprise a support wall separating the cylindrical portion of the inner cavity in an upper filtered compartment and a lower unfiltered compartment, with at least one throughbore in the support wall, and a filtering member supported by a periphery of the throughbore.

4. The filtration apparatus according to claim 3, wherein the filtering member projects into the lower unfiltered compartment.

5. The filtration apparatus according to claim 4, comprising a plurality of the throughbores and of the filtering members, and further comprising a cylindrical skirt projecting downwardly from the support wall to encompass the filtering members, the cylindrical skirt forming an annular plenum with the casing in the upper cylindrical portion of the casing.

6. The filtration apparatus according to claim 3, further comprising at least one jet in the upper filtered compartment, the at least one jet being aligned with the filtering member to blowback gas in the filtering member.

7. The filtration apparatus according to claim 6, further comprising a nozzle between the at least one jet and each said filtering members.

8. The filtration apparatus according to claim 1, further comprising a heat-exchange coil through which circulates a refrigerant, the heat-exchange coil being positioned in the gas outlet for absorbing heat from the gas exiting the casing.

9. The filtration apparatus according to claim 1, further comprising a single one of the inlet, with the inlet receiving a mix of solids and gas, the inlet being tangentially positioned with respect to the casing.

10. The filtration apparatus according to claim 1, wherein the casing has a circular section all along a vertical axis of the inner cavity of the casing.

11. The filtration apparatus according to claim 10, wherein a central axis of each said port is generally normal to a surface of the lower hopper portion.

12. The filtration apparatus according to claim 1, wherein an inlet of the annular casing is a tangentially oriented.

* * * * *